United States Patent
Håkansson (10) Patent No.: US 11,297,139 B2
(45) Date of Patent: Apr. 5, 2022

(54) METHOD AND APPARATUS FOR CLIENT SIDE ENCODING IN A DATA PROCESSING SYSTEM

(71) Applicant: Telefonaktiebolaget LM Ericsson (publ), Stockholm (SE)

(72) Inventor: Jim Håkansson, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 746 days.

(21) Appl. No.: 15/576,881

(22) PCT Filed: Jan. 29, 2016

(86) PCT No.: PCT/SE2016/050064
§ 371 (c)(1),
(2) Date: Nov. 27, 2017

(87) PCT Pub. No.: WO2016/195565
PCT Pub. Date: Dec. 8, 2016

(65) Prior Publication Data
US 2018/0152514 A1    May 31, 2018

Related U.S. Application Data
(60) Provisional application No. 62/168,030, filed on May 29, 2015.

(51) Int. Cl.
*H04L 29/08*    (2006.01)
*H04L 67/1097*    (2022.01)
(Continued)

(52) U.S. Cl.
CPC ........ *H04L 67/1097* (2013.01); *G06F 16/212* (2019.01); *G06F 16/2379* (2019.01); *G06F 16/258* (2019.01); *H04L 67/06* (2013.01)

(58) Field of Classification Search
CPC ........ G06F 16/20; G06F 16/21; G06F 16/211; G06F 16/212; G06F 16/213; G06F 16/23;
(Continued)

(56) References Cited

U.S. PATENT DOCUMENTS 4,714,995 A    12/1987  Materna et al.
5,446,880 A *   8/1995  Balgeman .............. G06F 16/258
(Continued)

FOREIGN PATENT DOCUMENTS

EP    1271360 A2    1/2003
EP    1376399 A2    1/2004
(Continued)

OTHER PUBLICATIONS

Khondkar, Mustafa. "Business Support System Integration: Call Detail Record Processing and Order Management Implementation." (2015) (Year: 2015).*

(Continued)

*Primary Examiner* — Vivek Srivastava
*Assistant Examiner* — William C McBeth
(74) *Attorney, Agent, or Firm* — Murphy, Bilak & Homiller, PLLC (57) ABSTRACT

In one aspect, a server in a data processing system stores database records in association with schema information identifying the particular schema by which the stored records are structured. Storing the schema information advantageously enables the node to provide schema information in association with requested records, enabling clients to determine the schema(s) associated with requested records. As a further advantage, the server in one or more embodiments operates as a central repository of schema definitions. Consequently, any given client requesting a record of a given record type can retrieve the schema used for structuring that record and translate the received record (Continued)

into the schema used by the requesting node for records of that type. Thus, disparate types of clients, or clients running different software versions, may use a central repository of data records of a given type, even where the clients use different schemas for processing such records.

16 Claims, 9 Drawing Sheets

(51) Int. Cl.
  *G06F 16/21* (2019.01)
  *G06F 16/23* (2019.01)
  *G06F 16/25* (2019.01)
  *H04L 67/06* (2022.01)

(58) Field of Classification Search
  CPC .... G06F 16/2379; G06F 16/25; G06F 16/254; G06F 16/258; G06F 16/27; H04L 67/06; H04L 67/10; H04L 67/1097; H04L 67/2823
  See application file for complete search history.

(56) References Cited

U.S. PATENT DOCUMENTS

| | | | |
|---|---|---|---|
| 6,427,151 B1* | 7/2002 | Chan | G06F 16/258 |
| 7,308,458 B2* | 12/2007 | Vincent, III | G06F 16/80 |
| 7,428,583 B1* | 9/2008 | Lortz | H04L 41/0893 |
| | | | 709/221 |
| 7,640,261 B2* | 12/2009 | Belyy | G06F 16/258 |
| 8,341,193 B2 | 12/2012 | Jones et al. | |
| 8,745,445 B1 | 6/2014 | Choi et al. | |
| 9,201,938 B2* | 12/2015 | Fischer | G06F 16/258 |
| 2005/0262106 A1* | 11/2005 | Enqvist | H04L 67/2823 |
| 2006/0206502 A1 | 9/2006 | Gaurav et al. | |
| 2007/0005613 A1* | 1/2007 | Singh | H04L 69/22 |
| 2007/0078909 A1* | 4/2007 | Tamatsu | G06F 16/221 |
| 2008/0222121 A1* | 9/2008 | Wiessler | G06F 16/258 |
| 2008/0256020 A1* | 10/2008 | Wakefield | H04L 61/1517 |
| 2009/0030943 A1* | 1/2009 | Kall | H04L 41/0226 |
| 2009/0049200 A1* | 2/2009 | Lin | G06F 16/258 |
| | | | 709/246 |
| 2009/0088254 A1* | 4/2009 | Courage | A63F 13/795 |
| | | | 463/42 |
| 2009/0187610 A1 | 7/2009 | Guo | |
| 2010/0106695 A1 | 4/2010 | Calder et al. | |
| 2011/0093436 A1 | 4/2011 | Zha et al. | |
| 2011/0208695 A1 | 8/2011 | Anand et al. | |
| 2012/0158889 A1* | 6/2012 | Heidasch | G06Q 10/067 |
| | | | 709/217 |
| 2012/0259872 A1* | 10/2012 | Sengupta | G06F 16/20 |
| | | | 707/756 |
| 2013/0013605 A1 | 1/2013 | Stanfill | |
| 2013/0013648 A1* | 1/2013 | Monjas Llorente | G06F 16/213 |
| | | | 707/803 |
| 2013/0232105 A1 | 9/2013 | Moser et al. | |
| 2014/0095432 A1 | 4/2014 | Trumbull et al. | |
| 2014/0279899 A1 | 9/2014 | Gu et al. | |
| 2016/0085777 A1 | 3/2016 | Engelko et al. | |

FOREIGN PATENT DOCUMENTS

| | | |
|---|---|---|
| EP | 2442597 A1 | 4/2012 |
| EP | 2618278 A2 | 7/2013 |
| WO | 0248856 A1 | 6/2002 |
| WO | 2016195565 A1 | 12/2016 |

OTHER PUBLICATIONS

Oracle, "Getting Started with NoSQL Database", 12c Release 1, Library Version 12.1.2.1,, Jan. 10, 2014, pp. 1-113.

* cited by examiner

METHOD AND APPARATUS FOR CLIENT SIDE ENCODING IN A DATA PROCESSING SYSTEM

TECHNICAL FIELD

The present invention relates to a data processing system, and particularly relates to a method and apparatus for client-side encoding in a data processing system.

BACKGROUND

A typical data processing system includes three different layers or components, namely a client, a server, and persistent data storage. Here, the "client" and "server" will be understood as a computer system or systems configured to perform the respective client-side and server-side operations. Oftentimes, the data processing system includes a plurality of clients, and the server maintains one or more repositories of electronic files—databases—as persistent data in the persistent data storage. Centralization of the data provides a convenient mechanism for enabling the individual clients to read, write, and update records in the database(s) accessible through the server.

Data exchanges between the server and respective clients, e.g., the interchange of database records, typically involve serialized data. The serialization process will be understood as the conversion of a data object or record into a byte stream for conveyance over a communication link between the server and each client. For example, the server uses localized storage to hold records in encoded form, and provides a requested one of the records to a requesting client, based on decoding the record, serializing the resulting decoded data, and passing the serialized decoded data along to the client. Correspondingly, any given client sends a record to the server for storage, based on serializing the record, and relying on the server to de-serialize, encode, and store the record.

For large databases and in data processing systems with high levels of activity, the data encoding and decoding operations represent a significant computational burden on the server. A known mechanism for alleviating the encoding/decoding burden pushes encoding and decoding operations out to the clients. With client-side encoding, the individual clients share the overall processing encoding/decoding burden, and the server receives serialized data records from respective ones of the clients that are already encoded. Likewise, the server sends requested records in their serialized, encoded form, and relies on the involved clients to perform any required coding and decoding.

While client-side encoding solves a number of problems, it introduces certain challenges. For example, different types of clients may use the same type of data for different purposes. For example, the particular data items or fields used to represent a "subscriber" of a telecommunication network may be different, as between different types of nodes or systems that process subscriber records. While a Home Location Register (HLR) node may represent individual subscribers using a comprehensive subscriber record having a relatively large number of record fields—data items—an Invoicing node within the billing system of the network may use only a subset of the overall subscriber record for invoice generation.

While not necessarily yielding maximum efficiency, client-side encoding may nonetheless be used in a data processing system that includes aforementioned HLR node and Invoicing node, subject to numerous caveats. Chief among the qualifying provisos, conventional implementations of client-side encoding require the HLR and Invoicing nodes to use the same schema for structuring client records. Here, a "schema" shall be understood as the underlying organizational pattern or structure used for representing a data record or object. By way of non-limiting example, then, the schema associated with a given type of record defines the fields included in the record, the order of the fields, and the field type(s) and formats.

Conventional approaches to client-side encoding, therefore, pose significant challenges in many types of data processing systems, particularly systems involving a disparate collection of node or functions types. It is recognized herein that it may be inefficient, or at least impractical, for different types of nodes to use the same schema for structuring records of the same record type. Moreover, it is recognized herein that such arrangements complicate the roll-out of new system capabilities and software versions, to the extent that such roll-outs are staged and introduce one or more nodes that, ideally, will operate with updated versions of one or more older schemas in use within the system.

SUMMARY

In one aspect, a server in a data processing system stores database records in association with schema information identifying the particular schema by which the stored records are structured. Storing the schema information advantageously enables the node to provide schema information in association with requested records, enabling clients to determine the schema(s) associated with requested records. As a further advantage, the server in one or more embodiments operates as a central repository of schema definitions. Consequently, any given client requesting a record of a given record type can retrieve the schema used for structuring that record, and translate the received record into the schema used by the requesting node for records of that type. Thus, disparate types of clients, or clients running different software versions, may use a central repository of data records of a given type, even where the clients use different schemas for processing such records.

Broadly, such teachings apply to a wide variety of network nodes. In an example embodiment, a method performed by a network node configured for operation in a data processing system includes processing records of a defined record type, according to a first schema used by the network node for structuring records of the defined record type. In the context of such processing, the method includes requesting a record of the defined record type from another network node, receiving the requested record from the other network node as a received record, along with a schema identifier identifying a second schema used for structuring the received record. The method further includes, responsive to determining that the second schema differs from the first schema, obtaining a definition of the second schema, and generating a local record corresponding to the received record. The local record generation is based on the network node identifying record fields that are common between the first and second schemas, extracting values from the received record for the common record fields and populating corresponding record fields in the local record with the extracted values. The method further includes processing the local record at the network node, as the received record.

In another, corresponding example embodiment, a network node is configured for operation in a data processing system and includes a communication interface circuit and a processing circuit. The communication interface circuit is configured to communicatively couple the network node to another network node in the data processing system, and the processing circuit is operatively associated with the communication interface circuit and configured to process records of a defined record type, according to a first schema used by the network node for structuring records of the defined record type. In the context of such processing, the processing circuit is configured to request a record of the defined record type from the other network node, receive the requested record from the other network node as a received record, along with a schema identifier identifying a second schema used for structuring the received record.

Responsive to determining that the second schema differs from the first schema, the processing circuit is further configured to obtain a definition of the second schema, generate a local record corresponding to the requested record, based on identifying record fields that are common between the first and second schemas, extracting values from the requested record for the common record fields and populating corresponding record fields in the local record with the extracted values. Still further, the processing circuit is configured to process the local record at the network node, as the received record.

Another example embodiment involves a method performed by a network node operating in a data processing system as a server with respect to one or more other network nodes operating as clients of the server. The method includes registering unique schemas used by given ones of the clients for structuring data records of one or more defined record types, including identifying each unique schema for each defined record type by a schema identifier, storing a schema definition for each identified schema, and returning the schema identifier to a registering one of the clients. The method further includes receiving and storing records from given ones of the clients, each record stored by the server in conjunction with schema information indicating the schema identifier of the schema used for structuring the record. Still further, the method includes sending requested records to given ones of the clients, including, for each requested record, sending the schema identifier of the schema used for structuring the record.

A related example embodiment involves a network node configured for operation in a data processing system as a server with respect to one or more other network nodes operating as clients of the server. The network node includes a communication interface circuit configured to communicatively couple the server to the one or more other network nodes, and a processing circuit operatively associated with the communication interface circuit. The processing circuit is configured to register unique schemas used by given ones of the clients for structuring data records of one or more defined record types, including identifying each unique schema for each defined record type by a schema identifier, storing a schema definition for each identified schema, and returning the schema identifier to a registering one of the clients. Further, the processing circuit is configured to receive and store records from given ones of the clients, each record stored by the server in conjunction with schema information indicating the schema identifier of the schema used for structuring the record; and send requested records to given ones of the clients, including, for each requested record, sending the schema identifier of the schema used for structuring the record.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
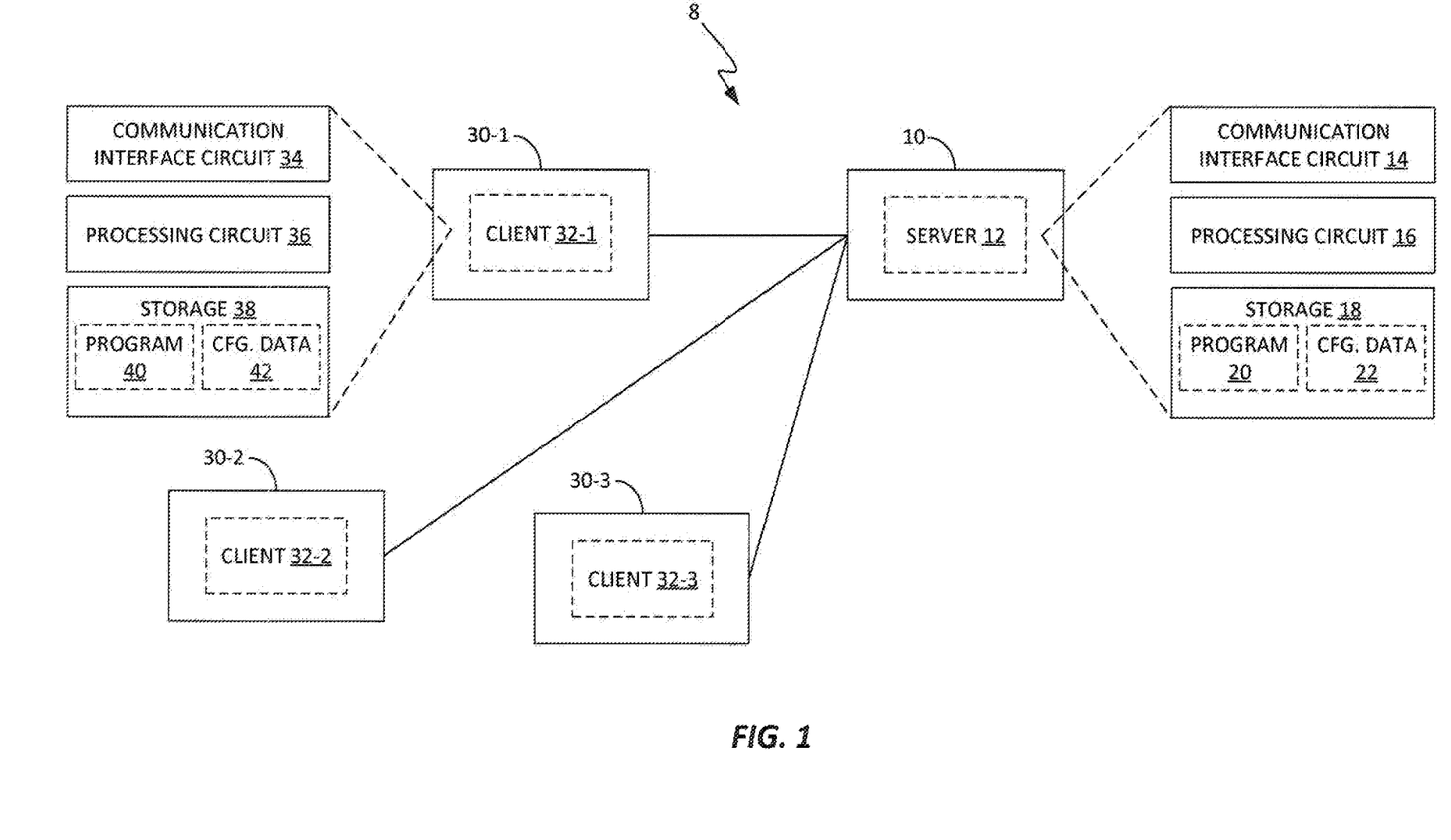
FIG. 1 is a block diagram of one embodiment of a data processing system, according to the teachings herein.

FIG. 1 illustrates a data processing network or system 8 that comprises a network node 10 configured for operation as a server 12 in the system 8. The network node 10 comprises a communication interface circuit 14, a processing circuit 16, and storage 18, e.g., for storing one or more computer programs 20 and various configuration data 22. Even in instances where the server 12 is "virtualized," it will be appreciated that the server 12 is realized via the programmatic configuration of processing circuitry.

More broadly, the depicted processing circuit 16 may comprise fixed processing circuitry, programmed processing circuitry, or a mix of fixed and programmed processing circuitry, and non-limiting examples of the processing circuit 16 include one or more digital signal processors, one or more microprocessors, one or more Application Specific Integrated Circuits (ASICs), one or more Field Programmable Gate Arrays (FPGAs), or other digital processing circuitry operatively configured via the execution of program instructions in the stored computer program 20.

Correspondingly, the storage 18 may comprise one or more memory circuits, storage devices, or a mix thereof, and may provide a mix of volatile or working memory storage, and non-volatile storage. In any case, the storage 18 comprises one or more types of non-transitory computer-readable media providing persistent storage for the computer program 20, and for various items of configuration data 22.

Here, "persistent" storage does not necessarily mean permanent or unchanging storage, but does connote retention of data for subsequent retrieval and processing.

The system 8 includes one or more other network nodes 30, with three such nodes 30-1, 30-2, and 30-3 shown by way of example. Each network node 30 is configured for operation as a client 32 with respect to the server 12 implemented via the network node 10. While any given network node 30 may implement more than one client 32, the diagram simplifies the discussion by illustrating a one-to-one relationship between network nodes 30 and clients 32, i.e., the network node 30-1 implements a client 32-1, the network node 30-2 implements a client 32-2, and the network node 30-3 implements a client 32-3.

Non-limiting example details appear for the network node 30-1/client 32-1, including a communication interface circuit 34, a processing circuit 36, and storage 38, e.g., for storing a computer program 40 and various configuration data 42. Even in instances where a client 32 on a given network node 30 is "virtualized," it will be appreciated that the client 12 is realized via the programmatic configuration of processing circuitry.

The depicted processing circuit 36 may comprise fixed processing circuitry, programmed processing circuitry, or a mix of fixed and programmed processing circuitry, and non-limiting examples of the processing circuit 16 include one or more digital signal processors, one or more microprocessors, one or more Application Specific Integrated Circuits (ASICs), one or more Field Programmable Gate Arrays (FPGAs), or other digital processing circuitry operatively configured via the execution of program instructions in the stored computer program 40. Correspondingly, the storage 38 may comprise one or more memory circuits, storage devices, or a mix thereof, and may provide a mix of volatile or working memory storage, and non-volatile storage. In any case, the storage 38 comprises one or more types of non-transitory computer-readable media providing persistent storage for the computer program 40, and for various items of configuration data 42.

While the same reference number 30 is used to show multiple network nodes, e.g., 30-1, 30-2, etc., different ones of these nodes may have different implementations and may fulfill different roles and perform different functions within the system 8. In other words, different clients 32 may perform markedly different operations within the overall system 8, although they may all work to one extent or another with data records of the same type or types.

The various network nodes 30 and the network node 10 may use the same or different protocols to communicate, and the communication interface circuit 14 of the network node 10 will be understood as comprising one or more interfaces, as needed, to communicate with the arrangement of network nodes 30. Such interfaces comprise, for example, physical-layer interface circuits, and associated processing circuits implementing the involved protocols. In a non-limiting example, the communication interface circuits 14 and 34 comprise Ethernet interfaces.

For ease of discussion, references to a network node 30 shall be understood as referencing the configuration or operation of the network node 30 in its role as a client 32 of the server 12, unless otherwise specified. Likewise, references to the network node 10 shall be understood as referencing the configuration or operation of the network node in its role as the server 12, unless otherwise specified. With these points of simplification in mind, each network node 30 is configured for operation in the system 8, and the included communication interface circuit 34 is configured to communicatively couple the network node 30 to the network node 10. Of course, the network node 30 may be communicatively coupled to other network nodes 10, or to nodes or entities not depicted in FIG. 1.

The processing circuit 36 of the network node 30 is operatively associated with the communication interface circuit 34 and configured to process records of a defined record type, according to a first schema used by the network node 30 for structuring records of the defined record type. In the context of such processing, the processing circuit 36 is configured to request a record of the defined record type from the other network node 10, receive the requested record from the other network node 10 as a received record, along with a schema identifier identifying a second schema used for structuring the requested record.

The processing circuit 36 is configured to determine whether the second schema is the same as the first schema used locally within the network node 30 for processing records of the defined type. Responsive to determining that the second schema differs from the first schema, the processing circuit 36 is configured to obtain a definition of the second schema and generate a local record corresponding to the received record, based on identifying record fields that are common between the first and second schemas, extracting values from the received record for the common record fields and populating corresponding record fields in the local record with the extracted values. The processing circuit 36 is further configured to process the local record at the network node 30, as the received record.

Figure 5:
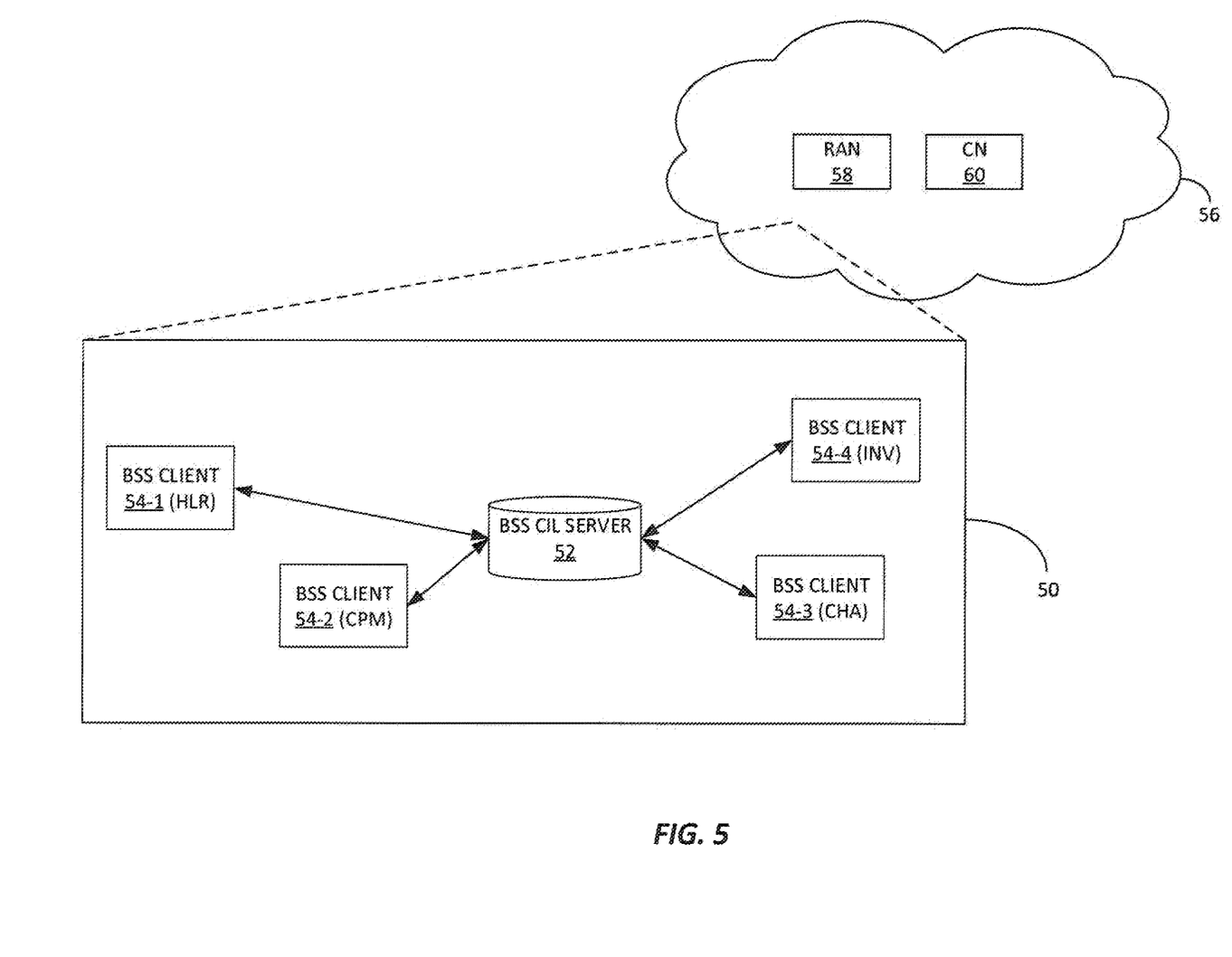
FIG. 5 is a block diagram of one embodiment of a Business Support System, BSS, associated with a telecommunication network, as an example implementation of the data processing system introduced in FIG. 1.

With momentary reference to FIG. 5, the network node 30 operates within a Business Support System (BSS) 50, which includes a BSS Common Information Layer (CIL) server 52. The BSS CIL server 52 is an example of the earlier introduced network node 10/server 12, and it enables different types and different versions of BSS applications to share and access data in the CIL. In this context, the network node 30 operates as any one of the BSS clients 54 depicted in the diagram.

In one example, the BSS clients 54 include a Home Location Register or HLR client 54-1 that translates between network subscriber identifiers and Mobile Station International Subscriber Directory Numbers (MSISDNs), a Customer Partner Management (CPM) client 54-2 that administers subscribers and the purchase of new subscription products, a Charging (CHA) client 54-3 that communicates with the associated telecommunications network 56 and tracks of the usage of different services provided by or through the telecommunications network 56 in real-time, and an Invoicing (INV) client 54-4 that handles invoicing against the subscriptions and tracks payments received.

In a non-limiting example, the telecommunications network 56 comprises a cellular network, e.g., one based on Third Generation Partnership Project (3GPP) specifications, such as the Long Term Evolution (LTE) specifications. In such embodiments, the telecommunications network 56 includes a Radio Access Network (RAN) 58 and a Core Network (CN) 60. Each BSS client or node 54 supports operations in the telecommunication network 56. For example, the given BSS nodes 54 each processing subscriber records, where a "subscriber record" broadly can be considered as a defined type of record. However, not all of the BSS nodes 54 use or process the same fields within each subscriber record and, indeed, different types of BSS nodes 54 or different versions of the same type of BSS nodes 54 may not use the same schema for structuring data records.

The client-side and server-side teachings advantageously provide for client-side encoding/decoding in combination with centralized server-managed record storage in such environments. That is, a given BSS client 54 requests subscriber records from the BSS server 52, which operates as a centralized repository for subscriber records and corresponding schema identifiers and schema definitions. To the extent that a subscriber record received from the BSS server 52 at a given BSS client 54 is structured according to a schema different than the schema used by the BSS client 54 for processing subscriber records, the BSS client 54 obtains—if necessary—a definition of the schema used for structuring the received subscriber record, and uses that definition to translate the received record into the structure defined by the schema used by the BSS client 54.

Figure 4:
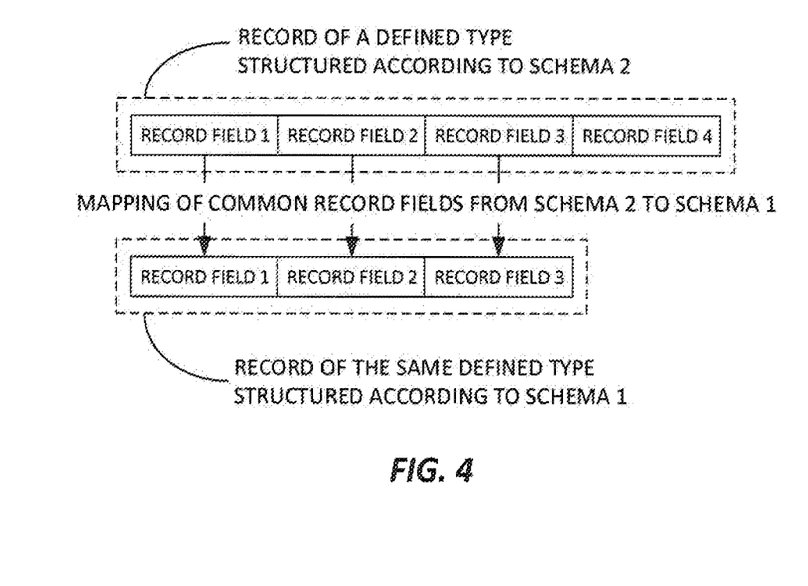
FIG. 4 is a diagram of an example of two copies of data record, structured according to first and second schemas.

FIG. 4 depicts an example context for better understanding such translations. A given network node 30 uses a first schema (Schema 1) for structuring records of a given defined type. The network node 30 requests a record of the defined type from the network node 10 and receives the requested record, along with an indication that the received record is structured according a second schema (Schema 2). If the network node 10 does not already have a definition of Schema 2, it can request the definition from the network node 10, or the network node 10 can include the definition in conjunction with providing the requested record.

In this example, Schema 2 is a superset of Schema 1, meaning that a subset of the record fields defined in Schema 2 are also defined in Schema 1. Consequently, the fields in Schema 1 that are common with Schema 2 can be populated, based on extracting the values of those common fields from the received record. More complex relationships between schemas are contemplated, but, in general, translating between two different schemas requires both schemas to have one or more corresponding or equivalent fields, such that values can be mapped between them.

The ability to map between schemas not only allows a given network node 30 to translate received records into a format usable locally by the network node 30, it allows the network node 30 to write or update records to the network node 10 using its local or native schema, or using the schema(s) associated with the records as received from the network node 10. In an example embodiment, the processing circuit 36 of any given network node 30 is configured to update a requested record, as stored at the other network node 10, based on being configured to translate the corresponding local record after completion of local processing, from the first schema to the second schema, and to send the translated local record to the other network node 10, for overwriting or otherwise updating the requested record, as stored at the other network node 10.

Put simply, in an example scenario, the network node 30 requests a record from the network node 10, receives the record, recognizes that the record is structured according to a different schema than is used locally by the network node 30 for processing the involved record type, translates the received record into a local record structured according to the local or native schema used by the network node 30, processes the local record, and, if part of the involved processing flow, the network node 30 returns an updated record to the network node 10 by mapping the local record back into the schema associated with the corresponding received record and returning the re-mapped record back to the network node 10. As a notable aspect of this processing, any fields in the received record that are not recognized, used, or otherwise modified by the network node 30 can be retained for inclusion in the re-mapped record. In this way, a network node 30 that uses only a subset of fields in a received record leaves the unused fields undisturbed.

Also, as mentioned earlier herein, each network node 30 may perform client-side encoding, such that the records stored at the network node 10 by respective ones of the network nodes 30 are encoded. In such embodiments, a network node 30 that receives a record from the network node 10 performs client-side decoding of the received record, for local processing. Likewise, the processing circuit 36 is configured to send the translated local record to the other network node 10 based on encoding the translated local record according to a defined encoding, and sending the encoded translated local record to the other network node 10, along with a schema identifier identifying the first schema.

In embodiments that use client-side encoding, the processing circuit 36 of any given network node 30 is configured to send records to the network node 10 by encoding them and sending them to the network node 10, where the records in one or more embodiments are serialized by the network node 30 for transmission as a byte stream. Notably, any given record sent from a network node 30 may be structured according to the local schema used by the network node 30 for records of the involved record type, or the network node 30 may translate its local copy of the record from the local schema used by the network node 30 into another schema. For example, where the local record corresponds to a received record that was structured according to a different schema, the processing circuit 36 in one or more embodiments is configured to translate the local record back into the schema associated with the received record, for encoding and return to the network node 10. In any case, the network node 10 sends information identifying the schema used for structuring the record, so that the network node 10 can store or otherwise bind that information when it stores the record as received from the network node 30.

In at least one embodiment, the processing circuit 36 is configured to register a first schema with the other network node 10, based on sending a definition of the first schema to the other network node and receiving a schema identifier identifying the first schema, in return from the other network node 10. Correspondingly, when sending a given record to the other network node 10 that is structured according to the first schema, the processing circuit 36 is configured to send the schema identifier of the first schema to indicate to the other network node 10 that the given record is structured according to the first schema. Here, the first schema will be understood as the local schema natively used by the involved network node 30 for processing records of the involved record type.

Figure 2:
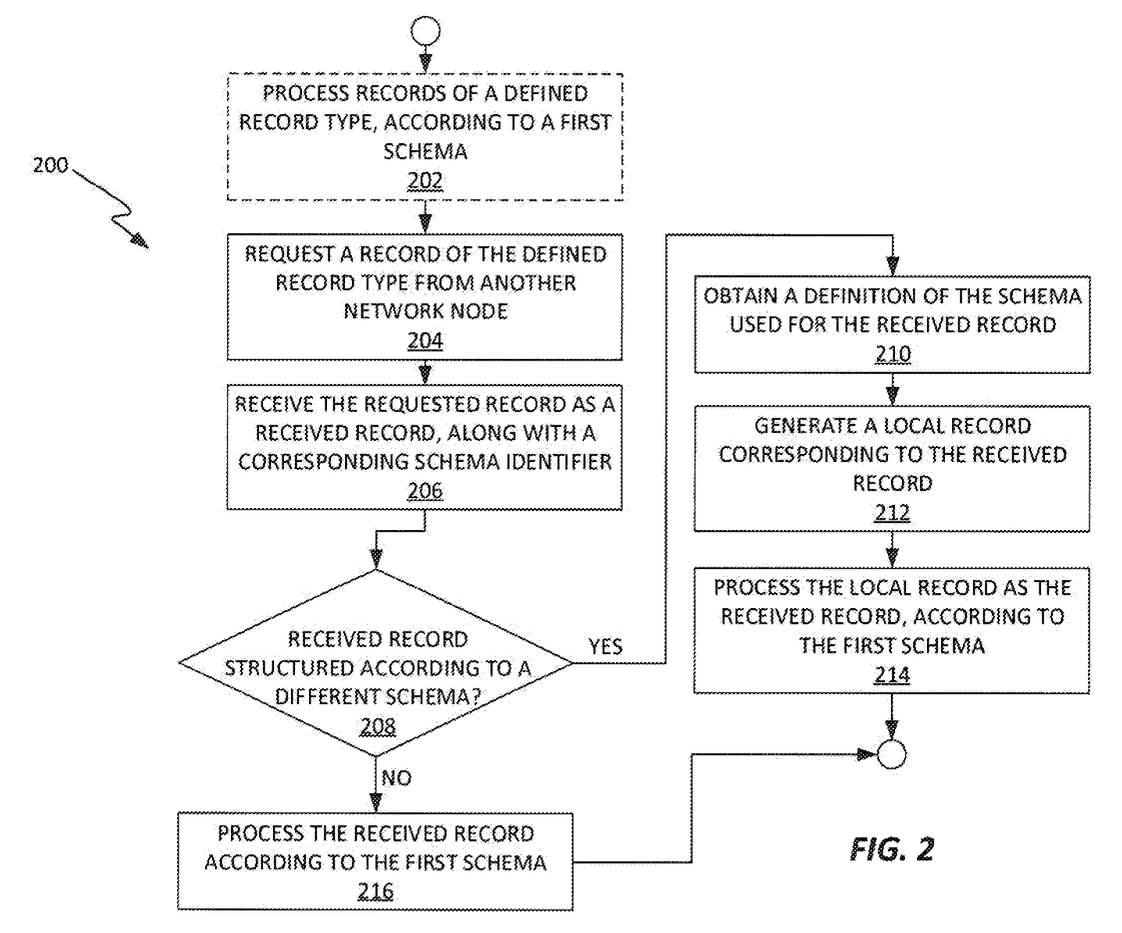
FIG. 2 is a logic flow diagram of one embodiment of a method of processing at a network node in a data processing system, such as a node configured for operation as a client.

Although any one or more of the above variations may be implemented in a network node 30, FIG. 2 illustrates a broader or more general method of operation contemplated for a network node 30, according to some embodiments. The method 200 includes processing (Block 202) records of a defined record type, according to a first schema used by the network node 30 for structuring records of the defined record type. While such operations appear as a discrete step in the illustrated processing flow, it should be understood as comprising, for example, a generalized or ongoing set or series of processing operations that encompass the further operations depicted in the flow.

The further operations include requesting (Block 204) a record of the defined record type from the network node 10—this operation constitutes the involved client 32 requesting a record from the server 12. The method 200 further includes receiving (Block 206) the requested record from the network node 10 as a received record, along with a schema identifier identifying a second schema used for structuring the received record.

The method 200 includes determining whether or not the second schema differs from the first schema (Block 208), and, responsive to determining that the second schema differs from the first schema (YES from Block 208), obtaining (Block 210) a definition of the second schema, and generating (Block 212) a local record corresponding to the received record. The local record generation is based on identifying record fields that are common between the first and second schemas, extracting values from the requested record for the common record fields, and populating corresponding record fields in the local record with the extracted values. The method 200 further includes processing (Block 214) the local record at the network node 30 as the received record.

In other words, the network node 30 converts the received record from the second schema to the first schema, and processes that local copy according to the structural definition of the first schema. Of course, if the second schema is the same as the first schema—i.e., the received record is already structured according to the schema used by the network node 30 for processing records of the involved record type—the method 200 follows the "NO" path from Block 208 and includes processing (Block 216) the received record according to the first schema, without need for schema conversion.

On the server-side, the network node 10 in one or more embodiments complements the client-side operations of the network nodes 30, based on the communication interface circuit 14 of the network node 10 being configured to communicatively couple the server 12 implemented by the network node 10 to the one or more other network nodes 30. Here, each of the network nodes 30 operates as a client 32 with respect to the server 12.

In turn, the processing circuit 16 of the network node 10 is operatively associated with the communication interface circuit 14 and is configured to register unique schemas used by given ones of the clients 32 for structuring data records of one or more defined record types, including identifying each unique schema for each defined record type by a schema identifier, storing a schema definition for each identified schema, and returning the schema identifier to a registering one of the clients 32. The processing circuit 16 is further configured to receive and store records from given ones of the clients 32, each record stored by the server 12 in conjunction with schema information indicating the schema identifier of the schema used for structuring the record. Still further, the processing circuit 16 is configured to send requested records to given ones of the clients 32, including, for each requested record, sending the schema identifier of the schema used for structuring the record.

In one or more embodiments, the processing circuit 36 is configured to receive and store the records in encoded form and to send requested ones of the records to requesting ones of the clients 32 in the encoded form. Here, the records in question may be received from clients 32 in encoded, serialized form, and stored by the processing circuit 16 in the storage 18 in encoded, serialized form, and returned to requesting ones of the clients 32 in encoded, serialized form. For a given record received from a given client 32, the processing circuit 16 is configured to receive the record in encoded form, along with a record identifier and the schema identifier of the schema used for structuring the record. The processor circuit 16 is configured to store the record in association with the record and schema identifiers received for the record, and to send the given record as a requested record by sending the given record in conjunction with sending the associated record and schema identifiers.

Such operations enable a given client 32 to read records from the server 12 that are structured according to schemas that are not "native" to the client 32. In particular, the processing circuit 16 is configured to send a corresponding one of the schema definitions stored at the server 12, in association with sending a given record from the server 12 to a given one of the clients 32 that has requested the given record. The processing circuit 16 sends the corresponding schema definition responsive to one of: a request for the corresponding schema definition, as received at the server 12 from the given client 32; and a determination by the server 12 that the corresponding schema definition is not one used by the given client 32 for the record type of the given record. In other words, the clients 32 may be configured to recognize when schema definitions are needed by the client 32, or the server 12 may be configured to recognize when a given client 32 needs a schema definition for translating one or more records requested by the client 32.

Figure 3:
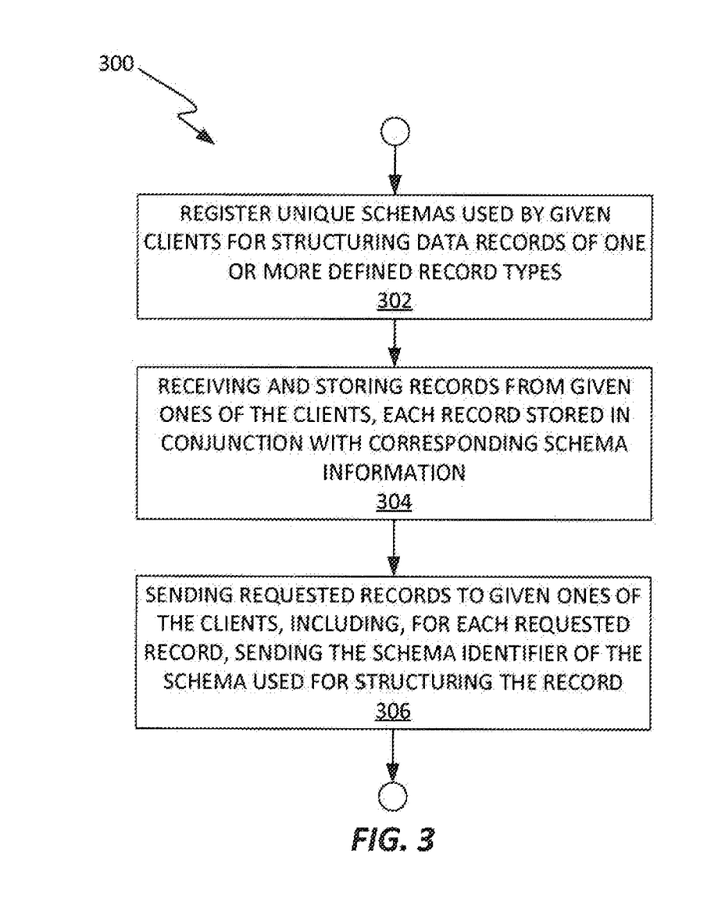
FIG. 3 is a logic flow diagram of one embodiment of a method of processing at a network node in a data processing system, such as a node configured for operation as a server.

FIG. 3 illustrates a method 300 performed by a network node 10 operating as a server 12 within a data processing system 8. The method 300 may encompass any one or more of the processing variations described above but broadly includes registering (Block 302) unique schemas used by given ones among any number of clients 32 for structuring data records of one or more defined record types. Such operations include identifying each unique schema for each defined record type by a schema identifier, storing a schema definition for each identified schema, and returning the schema identifier to a registering one of the clients 32.

The method 300 further includes receiving and storing (Block 304) records from given ones of the clients 32, each record being stored by the server 12 in conjunction with schema information indicating the schema identifier of the schema used for structuring the record. The method 300 further includes sending (Block 306) requested records to given ones of the clients 32, including, for each requested record, sending the schema identifier of the schema used for structuring the record.

A data processing system 8 in some embodiments herein comprises a first network node 10 configured for operation as a server 12 in the system 8, two or more additional network nodes 30 that are configured for operation in the system 8 as clients 32 of the server 12. The clients 32 use different schemas for structuring records of a defined record type—that is, for a given type of database record, a first one of the clients 32-1 uses a first schema for structuring such records, and a second one of the clients 32-2 uses a second schema for structuring such records. The second schema comprises, for example, a superset or a subset of the first schema, and the two schemas therefore have one or more record fields are common or equivalent fields.

The server 12 of the system 8 is configured to register each unique schema in use by the clients 32 for processing records of the defined record type, associate each unique schema with a corresponding schema identifier, and store a schema definition of each unique schema. Consequently, the server 12 operates as a centralized repository for all of the various schemas in use for any given type of database record. Further, the server 12 is configured to receive and store records of the defined record type from each of the clients 32, and to store the schema identifier associated with each record stored by the server 12. The clients 32 correspondingly are configured to send the corresponding schema identifiers in conjunction with sending records to the server 12, for storage at the server 12.

The server 12 is further configured to send a requested record to a requesting client 32, along with sending the associated schema identifier to the requesting client 32. Upon a further request by the requesting client 32, or upon a determination by the server 12, the server 12 is configured to send the schema definition of the schema identified by the associated schema identifier to the requesting client 32, and the requesting client 32 is configured to use the schema definition sent by the server 12 to interpret the requested record. Of course, it shall be understood that a given network node 30 may operate as a client 32 with respect to more than one server 12, and the schema handling taught herein may be implemented with respect to multiple servers and may involve multiple types of data records.

Figure 6:
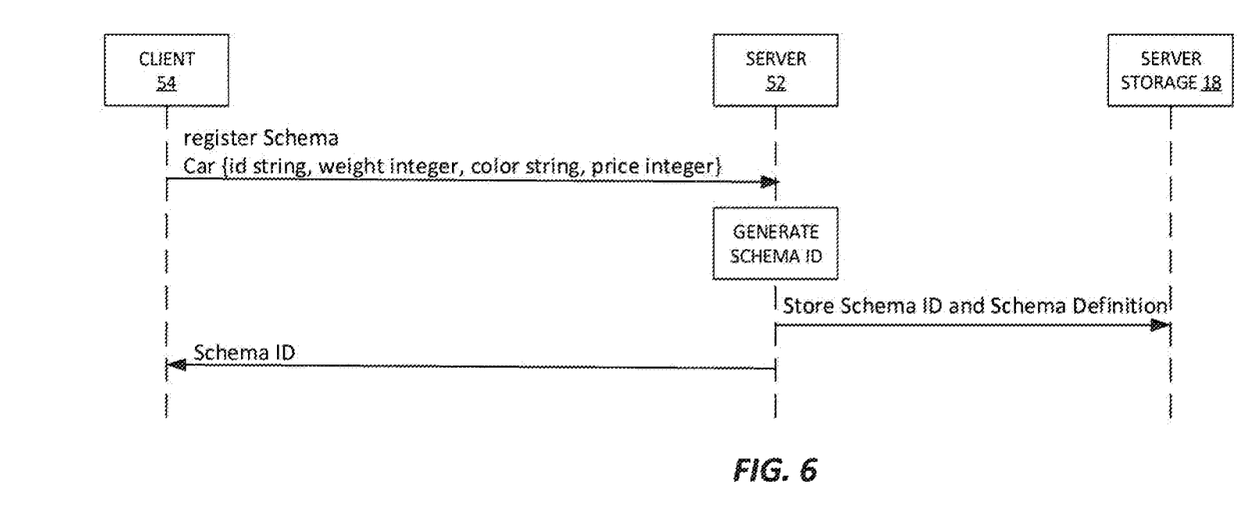
FIG. 6 is a diagram of one embodiment of signaling between a client and a server, for registering a schema used by the client for structuring records of a defined record type.

FIG. 6 illustrates an example signaling flow, where a BSS client 54 represents a type of the aforementioned clients 32 and where a BSS CIL server 52 represents a type of the aforementioned server 12. Here, the involved record type is "Car" and the Car schema used by the client 54 includes the following fields: a vehicle identifier as a string, a weight as an integer, color as a string, and price as an integer. The client 54 registers its Car schema with the server 52, and the server 52 generates a schema identifier (ID) to uniquely identify the Car schema in use by the client 32. The server 52 stores the schema ID, and the schema definition in the storage 18, and returns the schema ID to the client 32.

In subsequent transactions, the client 32 uses the assigned schema ID when sending records to the server 52 that are structured according to the Car schema. Similarly, the server 12 uses the schema ID to indicate records that are structured according to the Car schema, e.g., when the server 12 sends Car records to the client 32 or to another client 32.

Figure 7:
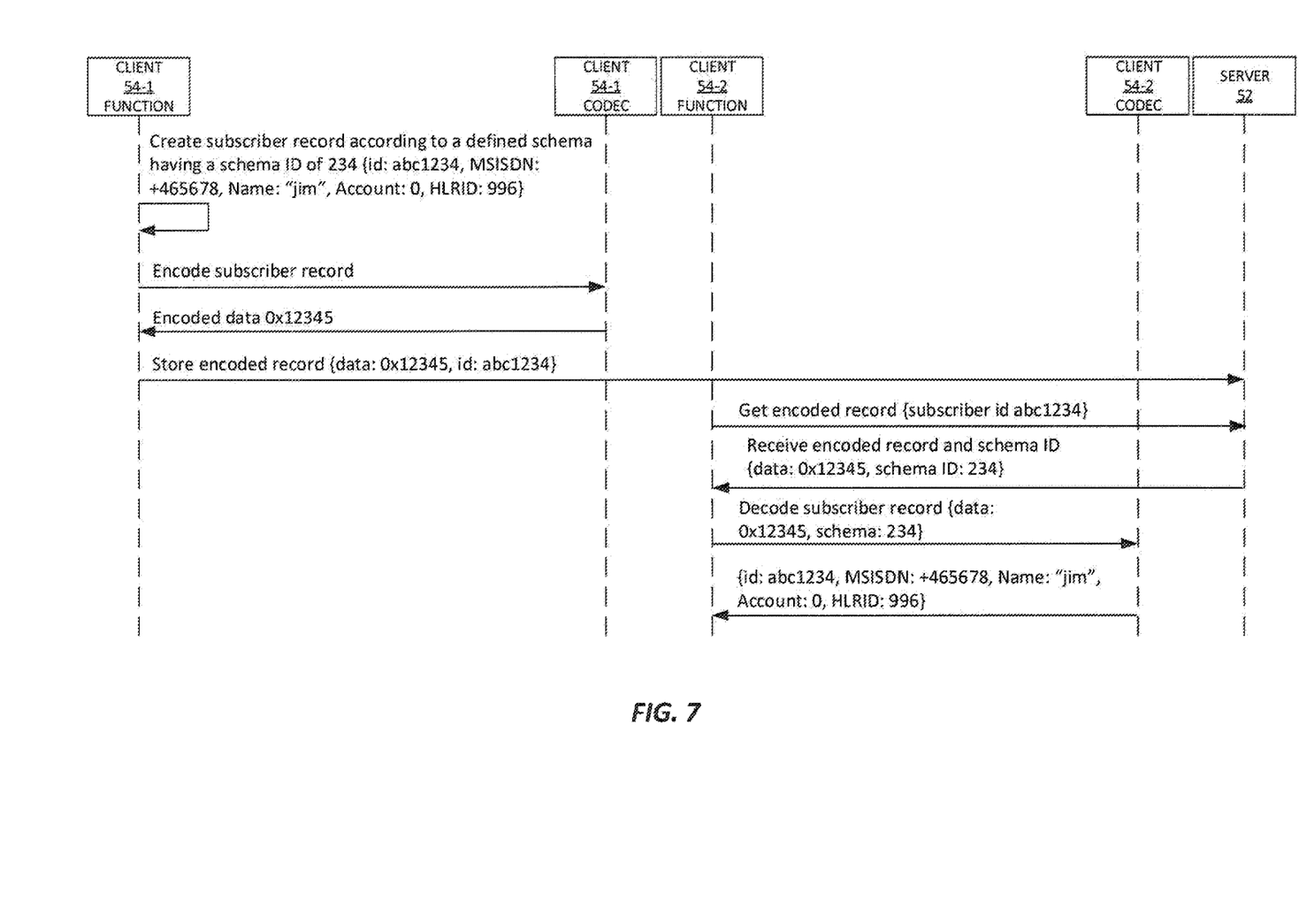
FIG. 7 is a diagram of one embodiment of signaling involving a server and two clients that use the same schema for processing records of a defined record type.

FIG. 7 illustrates another example signaling flow, involving two clients 54-1 and 54-2. The diagram differentiates between the processing function(s) implemented by each client 54 and the record encoder/decoder (codec) implemented by each client 54. The signaling flow presupposes that each client 54 performs client-side encoding and decoding of records, such that the records sent from each client 54 to the server 52 are encoded and stored at the server 52 in encoded form. The client 54-1 creates a "Subscriber" type record according to a Subscriber schema that is native to the client 54-1, and that has been registered with the server 52 and assigned a Schema ID of "234," where "234" denotes essentially any type of numeric, string, alphanumeric, or other identifier.

The Subscriber record includes the following fields: a record or Subscriber ID field having a value unique to the involved subscriber and represented here as "abc1234"; a MSISDN field set to the MSISDN of a communication device associated with the subscriber or the communication network subscription at issue; a Subscriber name, such as an email address or other string-based identifier; a Subscriber account number; and a HLR identification number. The client 54-1 encodes the Subscriber record and obtains a corresponding encoded record denoted as "0x12345," which it sends to the server 52, along with the record ID. Here, it may be assumed that the server 52 already knows the identifier and definition of the schema 234 used by the client 54-1, e.g., based on an earlier registration. Alternatively, the client 54-1 may be configured to indicated the schema ID associated with the encoded record.

The (encoded) record is stored by the server 52 in the storage 18 and is subsequently requested by the client 54-2, using the applicable Subscriber ID, which is known and used by the client 54-2 for the involved subscriber. The server 52 sends the requested record in encoded form—i.e., the serialized 0x12345 data, along with the Schema ID value of 234. The illustrated scenario assumes that the schema identified by the Schema ID 234 is also native to the client 54-2—i.e., both clients 54-1 and 54-2 use the same schema for structuring Subscriber-type records. Thus, the client 54-2 already has the schema definition and uses it to recover the received Subscriber record in decoded form, for local processing at the client 54-2.

Figure 8:
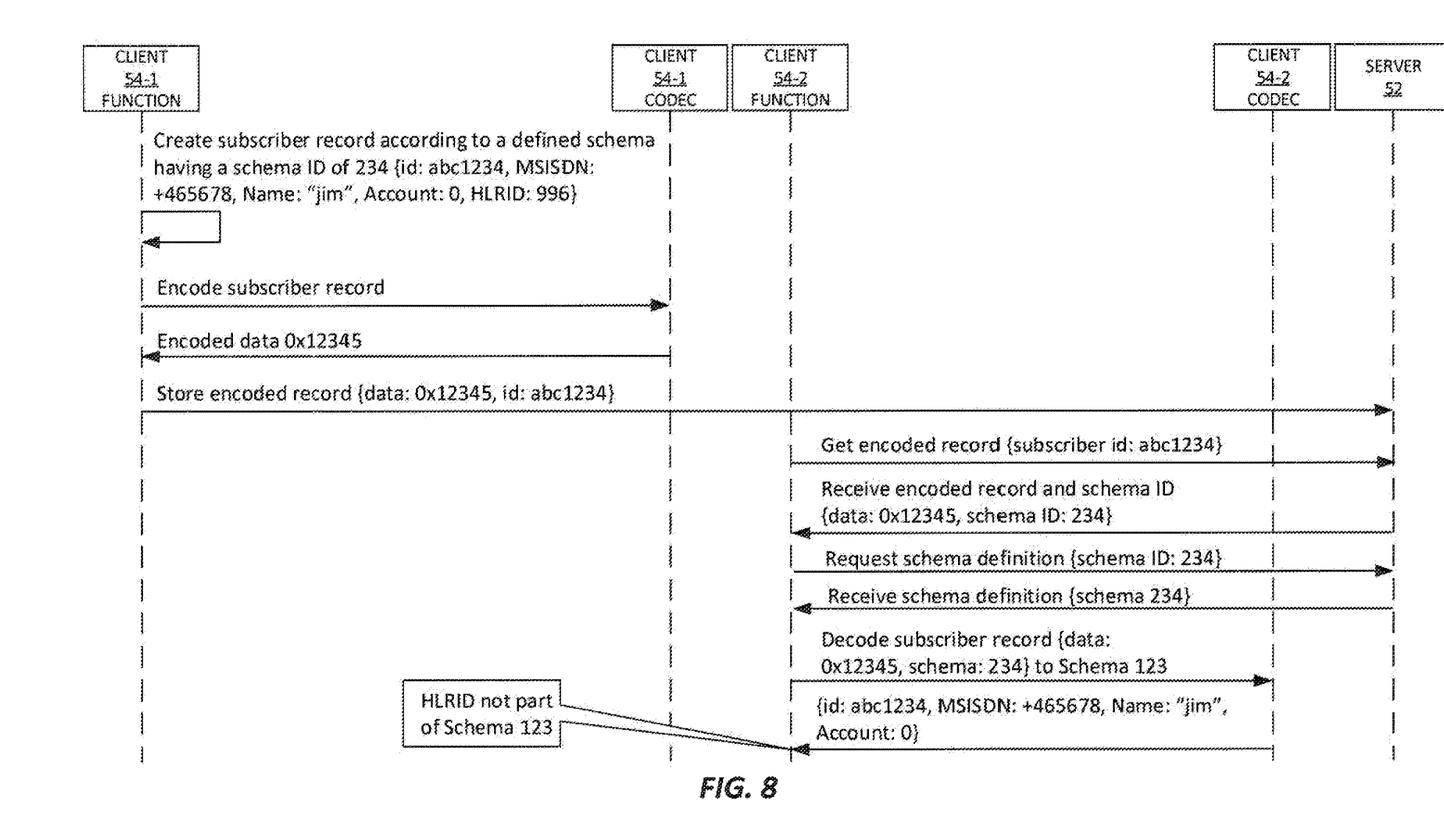
FIG. 8 is a diagram of one embodiment of signaling involving a server and two clients that use the different schemas for processing records of a defined record type.

FIG. 8 illustrates a similar signaling flow, with the notable exception of the client 54-2 using a different schema, denoted as "schema 123", than the one used by the client 54-1. For purposes of this example, the schema used by the client 54-2 for Subscriber-type records does not use the HLR ID field seen in the schema 234 used by the client 54-1 for Subscriber-type records. Thus, the schema 123 used by the client 54-2 uses a subset of the fields included in the schema 234 used by the client 54-1. Consequently, upon recognizing that the Subscriber record fetched from the server 52 is structured according to a schema not used by the client 54-2, the client 54-2 uses the Schema ID received in association with the fetched record to request the schema definition from the server 52, and it uses the schema definition provided from the server 52 to translate the received record into its native schema. This approach allows the client 54-2 to ignore or otherwise leave undisturbed any record fields not used or recognized by the client 54-2.

Figure 9:
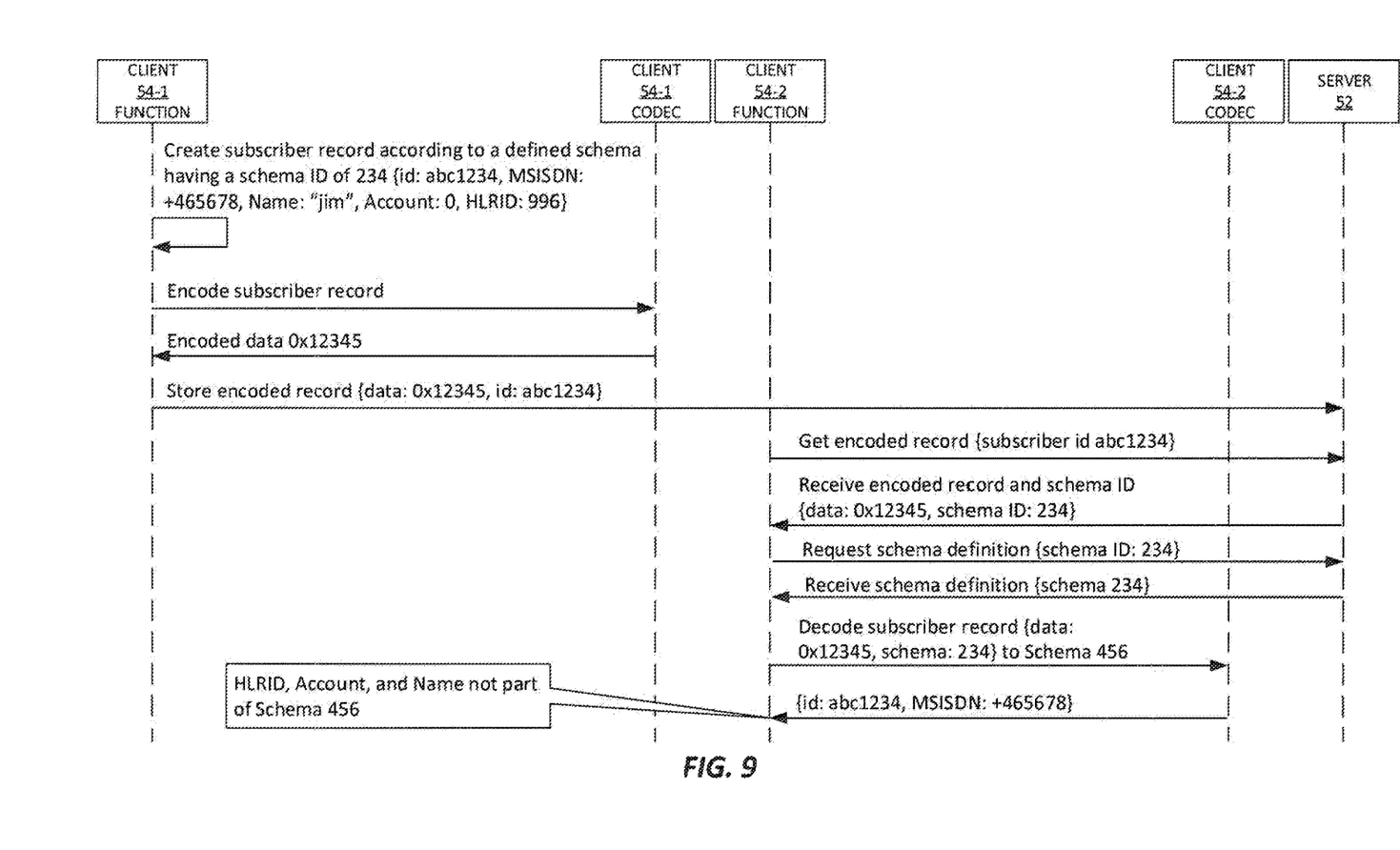
FIG. 9 is a diagram of another embodiment of signaling involving a server and two clients that use the different schemas for processing records of a defined record type.

FIG. 9 provides another example along the lines introduced in FIG. 8. In FIG. 9, however, an even smaller subset of record fields is recognized or used by the client 54-2. That is, one sees that the schema 456 used by the client 54-2 for Subscriber-type records includes only the Subscriber ID and MSISDN fields, from among the greater number of fields used by the client 54-1 for the same type of record.

Figure 10:
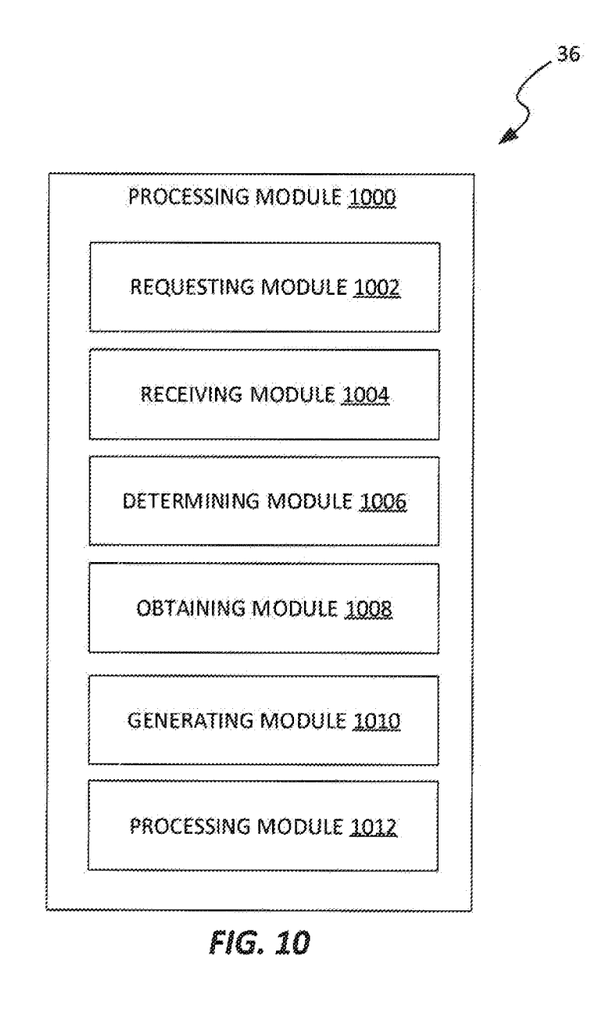
FIG. 10 is a block diagram of functional processing modules, as may be implemented in the processing circuitry of a client node.

FIG. 10 illustrates an example arrangement of functional modules, as may be implemented by the processing circuit 36 of a network node 30 configured for operation as a client 32 in a data processing system 8. The functional modules include a processing module 1000 that is configured to process records of a defined record type, according to a first schema used by the network node 30 for structuring records of the defined record type. The processing module 1000 includes or is further associated with a number of related modules, including a requesting module 1002 that is configured to request a record of the defined record type from a network node 10 acting as a server 12 in the system 8.

The network node 30 further includes a receiving module 1004 that is configured to receive the requested record from the network node 10 as a received record, along with a schema identifier identifying a second schema used for structuring the received record. A determining module 1006 is configured to determine whether the second schema is the same as or different than the first schema used by the network node 30 for processing records of the involved record type. The network node 30 includes an obtaining module 1008 that obtains a definition of the second schema, responsive to determining that the second schema differs from the first schema. Here, the obtaining step may be performed conditionally, based on determining whether or not the network node 30 already has knowledge of the schema definition.

Assuming that the second schema differs from the first schema, the network node 30 further includes a generating module 1010 that is configured to generate a local record corresponding to the received record, based on identifying record fields that are common between the first and second schemas, extracting values from the received record for the common record fields and populating corresponding record fields in the local record with the extracted values. Finally, the network node 30 includes a processing module 1012 that is configured to process the local record at the network node 30, as the received record. Of course, the network node 30 may include further modules, such as a module for writing or updating records by sending processed records or translated version thereof back to the network node 10.

Figure 11:
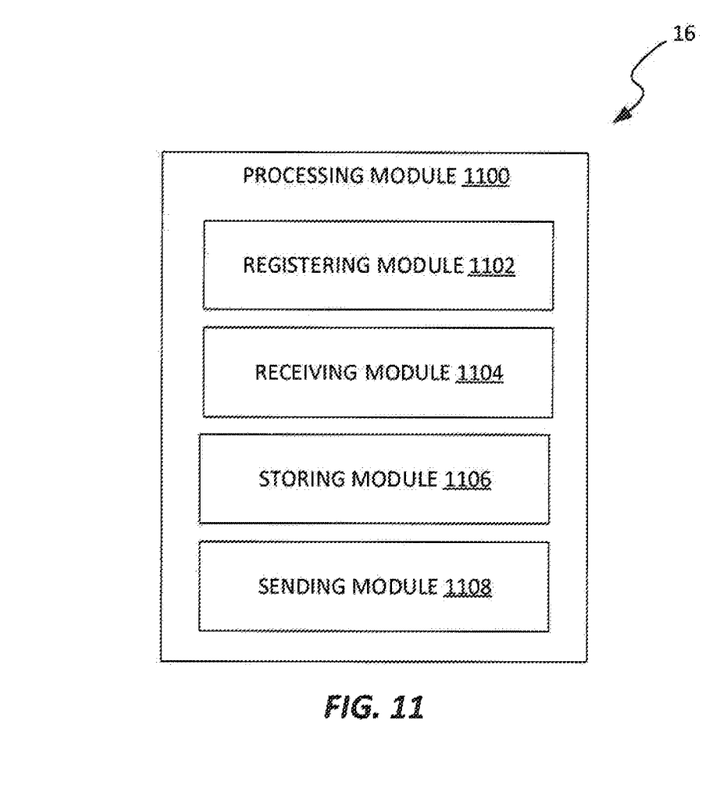
FIG. 11 is a block diagram of functional processing modules, as may be implemented in the processing circuitry of a server node.

FIG. 11 illustrates an example arrangement of functional processing modules or units, as may be implemented in the network node 10, to support operation of the network node 10 as a server 12 in a data processing system 8. The network node 10 includes a processing module 1100, which can be understood as encompassing an overall set or series of server operations performed by the network node 10 in its role as a server 12 in the system 8.

The processing module 1100 includes or is associated with a number of other functional modules, including a registering module 1102 that is configured to register unique schemas used by given ones of the clients 32 for structuring data records of one or more defined record types. The registering module 1102 is configured to identify each unique schema for each defined record type by a schema identifier, store a schema definition for each identified schema, and return the schema identifier to a registering one of the clients 32.

The network node 10 further includes receiving and storing modules 1104 and 1106, respectively, that are configured to receive and store records from given ones of the clients 32, each record being stored by the server 12 in conjunction with schema information indicating the schema identifier of the schema used for structuring the record. Still further, the network node 10 includes a sending module 1108 that is configured to send requested records to given ones of the clients 32, including, for each requested record, sending the schema identifier of the schema used for structuring the record. Of course, the network node 10 may include further processing modules, such as modules configured for inter-node communications associated with reading and writing database records, and it will be understood that other arrangements of functional modules may be implemented in such a way as to carry out the processing described herein.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a network node configured for operation in a data processing system, the method comprising:
  processing records of a defined record type, according to a first schema used by the network node for structuring records of the defined record type, wherein the network node comprises a Business Support System (BSS) node supporting operations in a telecommunication network;
  requesting a record of the defined record type from another network node, the other network node operating as a centralized repository for subscriber records and corresponding schema identifiers and schema definitions, wherein the requested record comprises a requested subscriber record corresponding to a subscriber of the telecommunication network, and wherein the other network node comprises a Common Information Layer (CIL) server node in a BSS network;
  receiving the requested record from the other network node as a received record, along with a schema identifier identifying a second schema used for structuring the received record;
  responsive to determining that the second schema differs from the first schema:
    obtaining a definition of the second schema from the other network node;
    generating a local record corresponding to the received record, based on identifying record fields that are common between the first and second schemas, extracting values from the received record for the common record fields and populating corresponding record fields in the local record with the extracted values; and
    processing the local record at the network node, as the received record.

2. The method of claim 1, wherein a set of record fields defined by the first schema comprises a subset of record fields defined by the second schema.

3. The method of claim 1, wherein obtaining the definition of the second schema comprises receiving the definition of the second schema from the other network node.

4. The method of claim 1, further comprising updating the requested record, as stored at the other network node, based on:
  translating the local record after completion of said processing, from the first schema to the second schema; and
  sending the translated local record to the other network node, for overwriting or otherwise updating the requested record, as stored at the other network node.

5. The method of claim 4, wherein sending the translated local record comprises encoding the translated local record according to a defined encoding, and sending the encoded translated local record to the other network node, along with the schema identifier identifying the second schema.

6. The method of claim 1, wherein the received record is encoded, and wherein extracting the values from the received record for the common record fields includes decoding the received record to obtain the values corresponding to the record fields comprising the received record.

7. The method of claim 1, further comprising sending a given record of the defined record type from the network node to the other network node, for storage at the other network node, wherein the given record is structured according to the first schema, and wherein the sending includes encoding the given record and sending the encoded given record to the other network node, along with a schema identifier identifying the first schema.

8. The method of claim 1, further comprising:
  registering the first schema with the other network node, based on sending a definition of the first schema to the other network node and receiving a schema identifier identifying the first schema, in return from the other network node; and
  when sending a given record to the other network node that is structured according to the first schema, sending the schema identifier of the first schema, to indicate to the other network node that the given record is structured according to the first schema.

9. A network node configured for operation in a data processing system, the network node comprising:

a communication interface circuit configured to communicatively couple the network node to another network node in the data processing system; and a processing circuit operatively associated with the communication interface circuit and configured to:

process records of a defined record type, according to a first schema used by the network node for structuring records of the defined record type, wherein the network node comprises a Business Support System (BSS) node supporting operations in a telecommunication network;

request a record of the defined record type from the other network node, the other network node operating as a centralized repository for subscriber records and corresponding schema identifiers and schema definitions, wherein the requested record comprises a requested subscriber record corresponding to a subscriber of the telecommunication network, and wherein the other network node comprises a Common Information Layer (CIL) server node in a BSS network;

receive the requested record from the other network node as a received record, along with a schema identifier identifying a second schema used for structuring the received record; and responsive to determining that the second schema differs from the first schema:

obtain a definition of the second schema from the other network node;

generate a local record corresponding to the received record, based on identifying record fields that are common between the first and second schemas, extracting values from the received record for the common record fields and populating corresponding record fields in the local record with the extracted values; and process the local record at the network node, as the received record.

10. The network node of claim 9, wherein a set of record fields defined by the first schema comprises a subset of record fields defined by the second schema.

11. The network node of claim 9, wherein the processing circuit is configured to obtain the definition of the second schema by receiving the definition of the second schema from the other network node.

12. The network node of claim 9, wherein the processing circuit is further configured to update the requested record, as stored at the other network node, based on being configured to:

translate the local record after completion of said processing, from the first schema to the second schema; and send the translated local record to the other network node, for overwriting or otherwise updating the requested record, as stored at the other network node.

13. The network node of claim 12, wherein the processing circuit is configured to send the translated local record to the other network node based on encoding the translated local record according to a defined encoding, and sending the encoded translated local record to the other network node, along with a schema identifier identifying the second schema.

14. The network node of claim 9, wherein the received record is encoded, and wherein the processing circuit is configured to extract the values from the received record for the common record fields by decoding the received record to obtain the values corresponding to the record fields comprising the received record.

15. The network node of claim 9, wherein the processing circuit is configured to send a given record of the defined record type from the network node to the other network node, for storage at the other network node, wherein the given record is structured according to the first schema, and wherein the sending includes encoding the given record and sending the encoded given record to the other network node, along with a schema identifier identifying the first schema.

16. The network node of claim 9, wherein the processing circuit is configured to:

register the first schema with the other network node, based on sending a definition of the first schema to the other network node and receiving a schema identifier identifying the first schema, in return from the other network node; and when sending a given record to the other network node that is structured according to the first schema, send the schema identifier of the first schema to indicate to the other network node that the given record is structured according to the first schema.

* * * * *